United States Patent
Fanshier et al.

(10) Patent No.: US 7,206,817 B2
(45) Date of Patent: *Apr. 17, 2007

(54) SYSTEMS AND METHODS FOR APPLICATION MANAGEMENT AND DEPLOYMENT

(75) Inventors: Stephen R. Fanshier, San Diego, CA (US); Sriram Srinivasan, Berkeley, CA (US)

(73) Assignee: BEA Systems, Inc., San Jose, CA (US)

( * ) Notice: Subject to any disclaimer, the term of this patent is extended or adjusted under 35 U.S.C. 154(b) by 634 days.

This patent is subject to a terminal disclaimer.

(21) Appl. No.: 10/341,801

(22) Filed: Jan. 14, 2003

(65) Prior Publication Data

US 2003/0225851 A1  Dec. 4, 2003

Related U.S. Application Data

(60) Provisional application No. 60/358,638, filed on Feb. 21, 2002, provisional application No. 60/349,436, filed on Jan. 18, 2002.

(51) Int. Cl.
*G06F 15/16* (2006.01)
(52) U.S. Cl. ............... 709/208; 717/120; 717/124
(58) Field of Classification Search ........ 709/200, 709/208; 717/120, 123, 168–178, 124; 379/207.02
See application file for complete search history.

(56) References Cited

U.S. PATENT DOCUMENTS

| | | | |
|---|---|---|---|
| 6,047,323 A | 4/2000 | Krause | 709/227 |
| 6,243,825 B1 | 6/2001 | Gamache et al. | 714/4 |
| 6,289,393 B1 | 9/2001 | Phillips et al. | 709/315 |
| 6,345,386 B1 | 2/2002 | Delo et al. | 717/11 |
| 6,360,331 B2 | 3/2002 | Vert et al. | 714/4 |
| 6,389,126 B1 * | 5/2002 | Bjornberg et al. | 379/201.03 |
| 6,418,554 B1 * | 7/2002 | Delo et al. | 717/174 |
| 6,546,554 B1 * | 4/2003 | Schmidt et al. | 717/176 |
| 6,973,647 B2 * | 12/2005 | Crudele et al. | 717/177 |
| 2003/0084056 A1 * | 5/2003 | DeAnna et al. | 707/100 |
| 2003/0135509 A1 * | 7/2003 | Davis et al. | 707/100 |

* cited by examiner

*Primary Examiner*—Frantz B. Jean
(74) *Attorney, Agent, or Firm*—Fliesler Meyer LLP

(57) ABSTRACT

In embodiments, a multi-phase approach can be used to deploy an application across a network or server cluster. A master deployer on an administration server is contacted, such as by a deployment tool, indicating that an application is to be deployed. The master contacts a slave deployer on each managed server that is to deploy the application, indicating that the slave should prepare for deployment. The slave can pull the application from an application source into a staging area for each managed server. In the staging area, each managed server explodes the application from an application archive file, if necessary, and attempts to load the application. The managed servers notify the master of the success of the load, and if all loads are successful each application can be moved to a production directory and activated.

6 Claims, 2 Drawing Sheets

SYSTEMS AND METHODS FOR APPLICATION MANAGEMENT AND DEPLOYMENT

CLAIM OF PRIORITY

This application claims priority to U.S. Provisional Patent Application No. 60/349,436, filed Jan. 18, 2002, entitled "SYSTEMS AND METHODS FOR APPLICATION DEPLOYMENT," as well as to U.S. Provisional Patent Application No. 60/358,638, filed Feb. 21, 2002, entitled "SYSTEM AND METHOD FOR APPLICATION MANAGEMENT AND DEPLOYMENT," each of which is hereby incorporated herein by reference.

COPYRIGHT NOTICE

A portion of the disclosure of this patent document contains material which is subject to copyright protection. The copyright owner has no objection to the facsimile reproduction by anyone of the patent document of the patent disclosure, as it appears in the Patent and Trademark Office patent file or records, but otherwise reserves all copyright rights whatsoever.

CROSS REFERENCE TO RELATED PATENT DOCUMENTS

The following co-pending U.S. patent document is assigned to BEA Systems, Inc., the assignee of the present application, and this document is hereby incorporated herein by reference:

U.S. patent application filed Jan. 14, 2003 to Srinivasan, et al., and entitled "Systems and Methods for Application Deployment".

FIELD OF THE INVENTION

The present invention relates to the deployment and management of applications and application modules.

BACKGROUND

When deploying applications in many presently available systems, there are limitations on what a user can do with an application deployment model. In some instances, applications must be completely deployed on each individual system. Further, it may not be possible to concurrently deploy multiple applications. The deployment of applications also creates potential problems in areas such as managing files and events for these applications. This problem is exacerbated when different applications are being deployed across the system. Current application deployment interfaces are not considered to be particularly usable, stable, or maintainable.

BRIEF SUMMARY

Systems and methods in accordance with one embodiment of the present invention can provide for the deployment of applications or application modules, such as across a network or to a server cluster. A master deployer on an administration server can be contacted, such as by a deployment tool, indicating that an application is to be deployed. The master deployer can contact a slave deployer on each managed server that is to deploy the application, indicating that the slave deployer should prepare to deploy the application.

The slave deployer can pull the application from an application source, such as an archive file or application directory as specified by the deployment tool. The application can be pulled to an application staging area for each managed server. In the staging area, the managed servers can explode the application from an application archive file and attempt to load the application. Each managed server can notify the master deployer of the success of the load. If all managed servers load the application successfully, the application can be moved to a production directory and the application can be activated.

Other features, aspects, and objects of the invention can be obtained from a review of the specification, the figures, and the claims.

DETAILED DESCRIPTION

Figure 1:
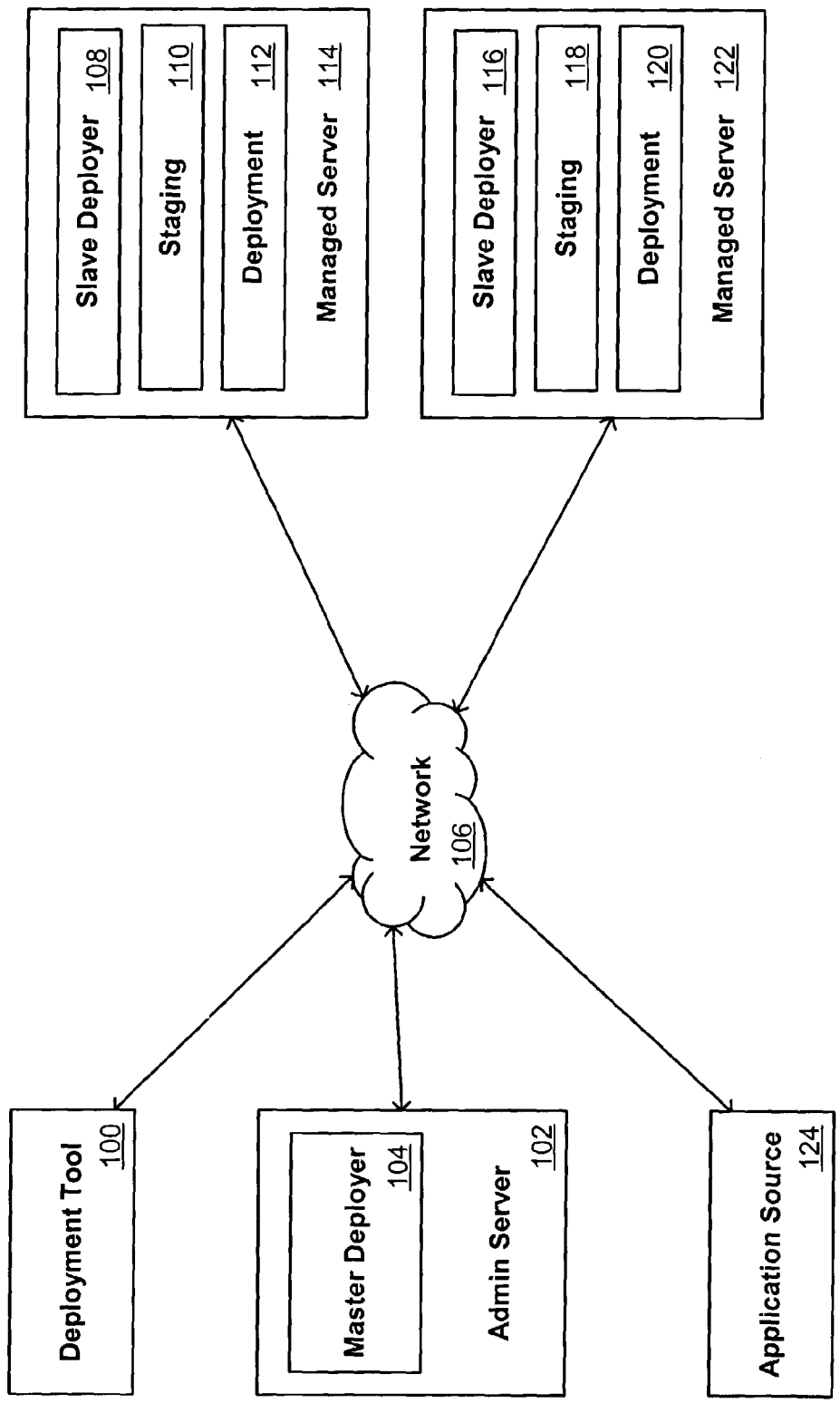
FIG. 1 is a diagram of a system in accordance with one embodiment of the present invention.

A system that can be used to deploy applications in accordance with one embodiment of the present invention is shown in FIG. 1. Such a system can use a multi-phase deployment process. A first phase in one such deployment can distribute and prepare an application. A second phase can involve the actual deployment, or activation, of the application with the relevant server subsystem.

A deployment tool 100, such as a standalone application or an administration console, can contact a master deployer 104 in an administration server 102 and point the master deployer to the source 124 of an application archive file or directory. The master deployer 104 can send this path to slave deployers 108, 116 in any relevant managed servers 114, 122, such as through a network 106. A slave deployer 108, 116 can pull the file into a staging directory 110, 118, explode the archive, and attempt to load the archive. This is an implementation of a "preparation" phase, which in this implementation can be thought of as a "load-and-validate" phase. Slave deployers 108, 116 can inform the master deployer 104 about the success of the load. If every managed server reports a successful load, the master deployer 104 can direct all relevant slaves 108, 116 to activate the installation. The slave deployers can copy or move the files from their staging 110, 118 to the production or deployment directories 112, 120. The newly deployed application(s) can then start accepting client requests.

Figure 2:
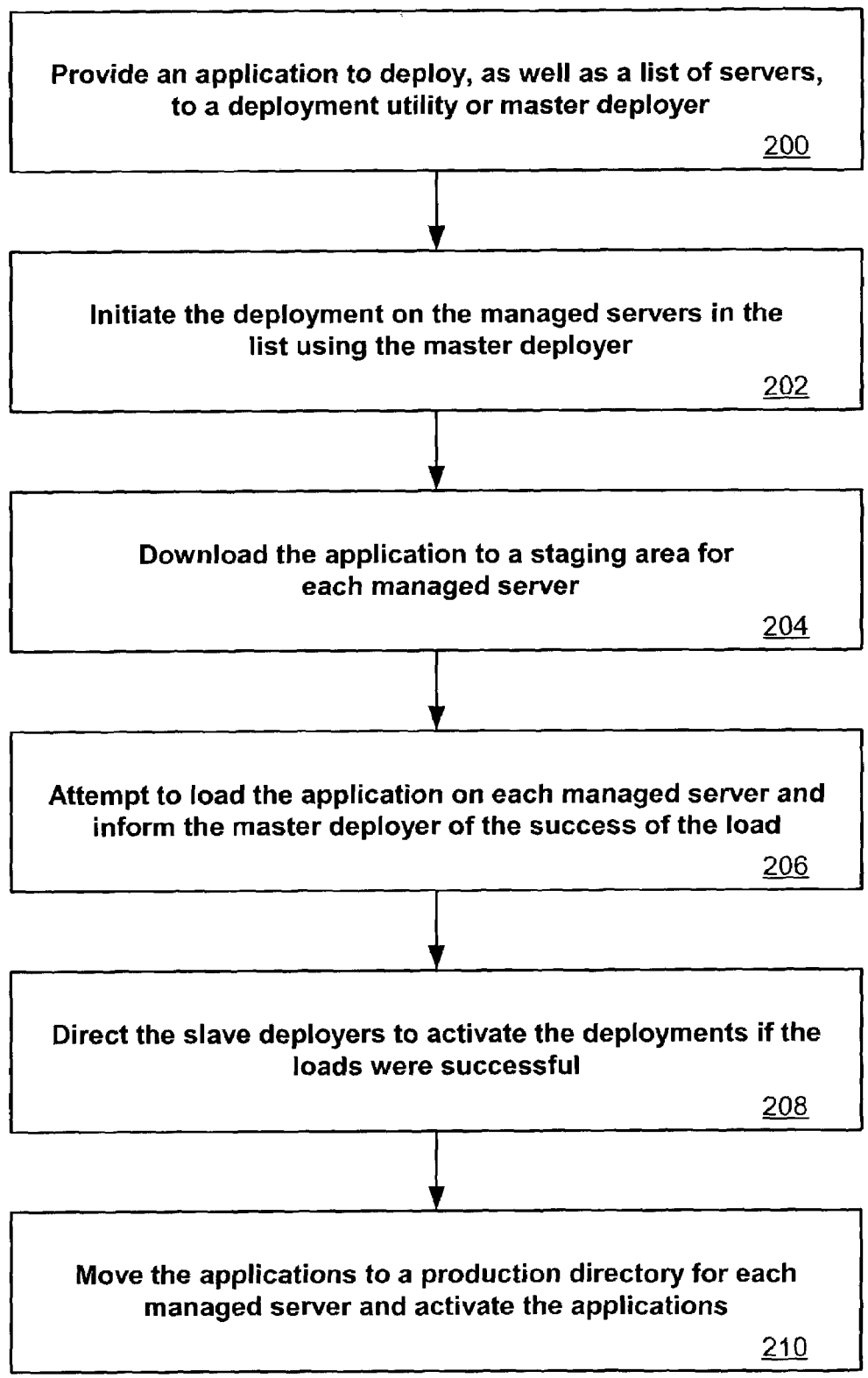
FIG. 2 is a flowchart showing the steps of a method that can be used with the system of FIG. 1.

The interaction between a master deployer and a slave deployer can utilize both phases of deployment, as shown in FIG. 2. A user can provide an application to be deployed, as well as target servers for that application, to a deployment utility 200. The deployment utility can interface with the master deployer to initiate the distribution of the application to the target servers 202. A master deployer can inform the target slave deployers, which can download the application to a staging area 204. The state of deployment can be maintained in relevant MBeans or configuration files for the application. Slave deployers can inform the master deployer about the success of the load 206. If the loads were successful, the master deployer can direct all relevant slaves to activate the installation 208. The slave deployers can copy or move the files from their staging directories to the production or deployment directories, and can activate the application(s) 210.

A file or directory path can be used to identify an application. When using a deployment tool, the contents of that file or directory can be made available to an administrator by copying or transferring, such as by using a file distribution servlet. Every effort can be made to avoid the movement of file. In the event that the source is specified to be in the correct staging location, the source can remain untouched. Once the application has been successfully staged and loaded by the relevant subsystems, the application can be copied into an active area and activated.

Application deployment can cover all standard J2EE deployable modules, such as enterprise applications, Enterprise JavaBeans (EJBs), web applications, and connectors. A deployable unit can be utilized according to the J2EE specification. An enterprise application can be archived, and an archived application can be identified by an .ear extension. The application directory structure can contain a descriptor file, such as META-INF/application.xml, which can be located in the top directory. An enterprise application can include any number of EJB, web, and connector modules, which may or may not be archived. An archived EJB can be identified by a .jar extension, and an archived connector can be identified by a .rar extension. An EJB directory structure can contain a descriptor file, such as META-INF/ejb-jar.xml, in the top directory. A connector directory structure can contain a descriptor file, such as META-INF/connector.xml, in the top directory. Table 1 shows the relationships between application types and the paths used to configure them, in accordance with one embodiment.

servers. In some embodiments, there may be a two-phase deployment for servers that can accept two-phase, and another deployment for those servers that cannot accept two-phase.

Source locations for an application can include a local directory or a file on an administration server. If the application is not to be staged, the source does not need to reside on the administration server. The type of application, such as an enterprise application, web application, EJB, or connector, can be implicit from the archive extension and the presence of the appropriate descriptor.

The staging of an application can involve the distribution of the application from an administration server to a managed server, placing the application in a configurable location that can be referred to as a staging directory. Staging can allow an administrator to be assured that the application has been successfully prepared on all targets prior to actual deployment. If the application fails to be staged to a subset of targets, the deployment can continue by activating the deployment on the targets that were successfully staged.

A staged version of an application can have the same structure as the original source. The source application can avoid modification in some embodiments. Staged files can be placed in a directory that is named, for example, using a server staging directory naming attribute. Files can be staged using a general approach for both enterprise applications and standalone modules. A "path" can refer to the root directory of an application. For enterprise applications, this can include the top-level directory or an .ear file. For standalone modules the root can be the parent directory of the module.

TABLE 1

Application Relationships

| Source path | Contents of source path | AppMBean.Path | CompMBean.URI |
|---|---|---|---|
| Enterprise App | | | |
| \apps\helloApp.ear | | apps\helloApp.ear | |
| \apps\helloApp | META-INF/application.xml | \apps\helloApp | |
| Standalone Module(s) | | | |
| \apps\helloWorld.jar | | \apps\ | helloWorld.jar |
| \apps\helloWorld | META-INF/ejb-jar.xml | \apps\ | helloWorld |
| \apps\helloWorld | ejb1/META-INF/ejb-jar.xml ejb2/META-INF/ejb-jar.xml | \apps\ | helloWorld/ejb1 helloWorld/ejb2 |
| \apps\helloWorld | META-INF/ejb-jar.xml ejb2.jar | \apps\ | helloWorld helloWorld.ejb2.jar |
| \apps\helloWorld | connector.rar ejb.jar | \apps\ | helloWorld helloWorld.ejb2.jar |
| \apps\helloWorld | ejb/ejb.jar | May not be supported - archives may need to be at the first level | |

Modules for an application can be targeted to targets such as a cluster, a clustered server, or an unclustered server. If a clustered server is specifically targeted, the deployment of the application can be treated as a cluster deployment. All members of the target can be notified of the deployment and can take the appropriate action.

The modules can also be targeted to all supported servers. If all targeted servers are two-phase compatible, two-phase deployment can be used. If any of the servers that are targeted are not two-phase compatible, the two phase protocol may not be able to be used, and the deployment can proceed with a deployment that is compatible with those A "staging path" can use the application name to enforce uniqueness between different applications that can use a similarly named URI.

In order to activate an application, the files for that application may need to be in the active application area on the managed server. Copying the files from the staging area to the active area can be performed during an activate phase of deployment. If activation fails for a subset of targets, the deployment can still be allowed to proceed.

The staging of applications can be based on a number of server configuration attributes, such as for example StagingDirectoryName, ActiveDirectoryName, and StagingEnabled. In an environment that does not take advantage of shared file systems, these attributes can be defaulted. This can result in all files being downloaded from an administration server to the staging directory for the managed server, then activated from the active area. In an environment that shares file systems, the copying and distribution of files can be minimized. Administrators may choose to manage the placement of applications on managed servers instead of using the staging feature.

If the staging directory for managed servers is shared with a directory on an administration server, there may be no need to distribute files during deployment. These files may already exist in the managed server staging area. The relevant managed servers can be configured with a staging enabled attribute set to 'false'. Placing application files in a shared directory may be sufficient.

An administrator can configure managed servers not to copy files from the staging area to the active area. This can be the case when a staging directory name is the same as an active directory name. Sharing staging and active areas on a managed server can inhibit certain hot deployments, as the files can be in use while attempting to redeploy. This can happen when applications are archived or running on Windows NT systems, for example.

If managed servers are configured not to require staging, it can be assumed that the files are already residing on the managed server and the application does not need to be downloaded from the administration server. This can happen regardless of whether the file systems are shared. An application can be targeted to multiple managed servers and can stage the application files only on those servers that have enabled staging.

An application can also be configured to override the staging mode of a managed server. This can be accomplished with a staging mode attribute of an application MBean, for example. Possible values include 'server', 'stage', and 'nostage'. 'Server' can be the default value, designating that staging should be performed based on target server configuration. 'Stage' can be used to stage the application, regardless of server configuration. 'Nostage' can be used such that the application is never staged, regardless of server configuration. In one instance the 'nostage' option can be used when an application cannot reside on the administration server. In this case, the application can be deployed from the source path, relative to the target server file system.

An application can have one source path that applies to all servers, and the path can be absolute or relative. If the path is relative, it can be based on the staging directory of the target server. For example, if an application has a source path of myapps/app.ear and is configured with 'StagingMode=nostage', then the staging directory for all targeted servers may need to contain the file myapps/app.ear.

The primary difference between deploying an application to a cluster and deploying an application to a standalone server is that any failure during the preparation or staging of the clustered deployment can inhibit the activation phase of the deployment. The deployment may not be allowed to accept service requests. Any failure during the activation phase of a clustered deployment can further result in a cancellation of the task. Cluster members that were successfully activated can remain activated, but the cluster can end up in an inconsistent state. Failures occurring during the preparation phase can result in the rollback of those members that have successfully acknowledged the prepare. A rollback may not remove any files that may have already been staged, but can cause the container-side changes that occurred during the preparation to revert.

The members in a cluster that can affect the success of a deployment can be, for example, those which are configured as 'ExpectedToRun' and are actually running. When a new server enters into a cluster and is set as ExpectedToRun, the deployment manager can attempt to deploy all configured applications, and the updates to those applications, during server startup. If the server fails while staging the application, that application will not be deployed. Similarly, subsequent updates will not be deployed.

During the startup process, the managed server can activate all configured applications that are targeted to that server. Failure to activate any applications can be logged to the server log. If any of these applications are older than indicated in the domain configuration, the applications can be updated before being activated, such as by being downloaded from the administration server.

At any point in time, a managed server can be partitioned from an administration server. During an outage, it is possible that a managed server may have missed one or more application deployment requests. If the server missed more updates than are retained, the server can receive a full redeployment of the relevant applications. If the missed deployments are all partial updates, the server can process each retained deployment in order. If a remove request is the last update, the server can remove the application and skip all other updates. If the missed deployments include a full redeployment, the server can process just the full redeployment and ignore all partial updates.

If the server processes just the full redeployment and ignores all partial updates, the implication is that the application source is always the currently preferred version, and that if the application is configured to be deployed to a server then it should have the source files identified by the application configuration. It is possible that the user placed new files in the application source but has not yet requested that they be deployed. The managed server may not be aware of this situation, and the updated application may be deployed. This user can be cautioned not to use the configured source path of the application as the application development area.

It is possible that an administration server can crash that has deployment tasks outstanding. These tasks and their status can be lost. The domain configuration can reflect the deployment updates, however, and the administration server can force the deployment of the applications when it is restarted. This redeployment must be a full redeployment in some embodiments, as there will be no attempt to determine the specific changes in the application.

Managed Beans (MBeans)

To date, application-related MBeans have been overloaded with the actual management of deployment tasks. One goal for these MBeans is to limit their functionality to the management of configuration information and state information, moving the deployment tasks to a separate subsystem. No external interfaces may be removed, but a certain amount of depreciation can occur. Depreciated methods can have the same basic functionality, but may not take advantage of new deployment features.

A management API can be defined by the server MBeans. A specific MBean of interest is an application MBean, which can define an application. The application can be an enterprise application or a wrapper for a standalone module. A component MBean can be the base interface for a container-specific component MBean. A deployer runtime MBean can be an interface for user interfaces to deployment requests. A deployment task runtime MBean can be an interface for encompassing deployment tasks.

A deployment task can be initiated through a deployer runtime MBean, a singleton that can reside on the administration server. A deployer runtime MBean can provide methods for activating, deactivating, and removing an application. These methods can return a deployment task runtime MBean that encapsulates the request and provides the means for tracking its progress. This MBean can provide the ongoing status of the request through target status objects, such as with one status object per target.

The management API can be asynchronous. A client can poll the status or utilize MBean notifications to determine when the task is complete. The client can be responsible for unregistering a deployment task runtime MBean. A deployment notification can be broadcast for certain events, which can be defined in a deployment notification class. These events can include preparing, prepared, activating, activated, deactivating, and deactivated events. The targets can be triggered on the target servers. Applications can listen for these events by adding themselves as a notification listener on the application MBean. To monitor an application named 'myapp', for example, the following code example could be used:

//home is accessed from JNDI
ApplicationMBean app=home.getMBean("myapp", "Application");
MbeanServer server=home.getMBeanServer( );
NotificationListener listener=new MyNotificationListener( );
NotificationFilter filter=new MyNotificationFilter( );
server.add NotificationListener(app.getObjectName( ), listener, filter, null);

The MyNotificationListener class in the above example can implement a notification listener interface and perform any processing required when the notification is received. The notification can be received any time a method such as handleNotification( ) is invoked. A class such as MyNotificationFilter can implement a notification filter interface and can be used to filter out any notifications on the MBean that are not associated with deployment.

The load order for applications at startup can be configured such that there is a guaranteed ordering. This can be useful when one application depends on the classes provided by another application. An ApplicationMBean attribute, such as LoadOrder, can be set as an integer value that is used to sort configured applications during server startup. This may only apply to applications that are deployed through a two-phase process. The lower the LoadOrder value, the earlier the application can be deployed on the server.

To deploy an application configured in an ApplicationMBean, such as appMBean, the following code can be used:
appMBean.load( );
appMBean.setDeployed(true);

This can result in all relevant MBeans being initialized and the application being downloaded to the managed server. The relevant containers can also be notified of the redeployment. To undeploy the application, the following code can be used:
appMBean.setDeployed(false);

A refresh operation can be used in place of load( ) to update the content of a deployed application. An ApplicationMBean can support a deploy( ) and undeploy( ) operation, which can be used if the relevant MBeans are already configured. This can be similar to using a setDeployed (true or false) method. Component MBeans can have an attribute such as Targets which can list the servers targeted by the component. Adding or removing a server from this list can trigger a new deployment or removal of the application from a server. An assumption can be made that the application is properly configured.

Within a cluster, it may be necessary for all servers to be using the same software version, or at the same release level. Targeted servers can use different versions when deploying an application, but can use two phase protocol only if all servers are so capable.

Deployment management features can utilize message catalog-based logging in at least some cases. A deploy utility can utilize message catalogs for all non-diagnostic output. Textual data passed between servers as part of the deployment process can be encapsulated as serialized objects, and may not be subject to encoding concerns. String attribute values may not be restricted to any particular character encoding.

For a data replication service (DRS) dependency, a mechanism can be provided for a two-phase transactional coordination of cluster deployments. A non-transactional one-phase service can be provided for unclustered deployments. The type of coordination can be determined based on target information.

For Java 2 Platform, Enterprise Edition (J2EE) compatible systems, interfaces can be provided for the preparation and activation of deployments on managed servers. Tiered deployments can be handled for both clustered and unclustered environments.

A console can be used to provide access to new MBean attributes and to new MBeans. Such a console can also support asynchronous deployments. The console can utilize new deployment interfaces, and can provide a mechanism for reporting the status of active and completed deployments.

The foregoing description of preferred embodiments of the present invention has been provided for the purposes of illustration and description. It is not intended to be exhaustive or to limit the invention to the precise forms disclosed. Many modifications and variations will be apparent to one of ordinary skill in the relevant arts. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the claims and their equivalence.

What is claimed is:

1. A system for deploying an application across a network, comprising:
    an administration server containing a master deployer;
    a managed server containing a slave deployer, the managed server being managed by said administration server, the slave deployer can receive a deployment instruction from the master deployer and attempt to load the application, the slave deployer can inform the master deployer of the success of the load and further can deploy the application upon receiving a deploy command from the master deployer;
    a staging directory adapted to receive the application from a source and the staging directory for allowing the managed server to attempt to load the application; and
    the managed server receives an archive file containing the application, and wherein the managed server is further adapted to move the archive file into the staging directory and explode the archive file in order to load the application.

2. A method for deploying an application across a network, comprising:
- contacting a master deployer on an administration server to indicate that an application is to be deployed;
- contacting a slave deployer on each managed server managed by the administration server to indicate that an application is to be deployed on that managed server;
- moving the application to an application staging area for each managed server;
- activating the application on each managed server;
- attempting to load the application from the staging area for each managed server; and determining whether the loads were successful before activating the application on each managed server.

3. A method for deploying an application across a network, comprising:
- contacting a master deployer on an administration server to indicate that an application is to be deployed;
- contacting a slave deployer on each managed server managed by the administration server to indicate that an application is to be deployed on that managed server;
- moving the application to an application staging area for each managed server;
- activating the application on each managed server;
- attempting to load the application from the staging area for each managed server; and
- determining to activate the application on each managed server only if the load was successful on each managed server.

4. A method for deploying an application across a network, comprising:
- contacting a master deployer on an administration server to indicate that an application is to be deployed;
- contacting a slave deployer on each managed server managed by the administration server to indicate that an application is to be deployed on that managed server;
- moving the application to an application staging area for each managed server;
- activating the application on each managed server; and
- moving the application from a staging directory to a production directory before activating the application.

5. A method for deploying an application to a cluster, comprising:
- contacting a master deployer on a cluster management server to indicate that an application is to be deployed;
- contacting a slave deployer on at least one cluster server in the cluster managed by the cluster management server to indicate that an application is to be deployed;
- moving the application to an application staging area;
- activating the application; and
- determining to activate the application on the cluster only if the load was successful on each cluster server in the cluster receiving the application.

6. A method for deploying an application to a cluster, comprising:
- contacting a master deployer on a cluster management server to indicate that an application is to be deployed;
- contacting a slave deployer on at least one cluster server in the cluster managed by the cluster management server to indicate that an application is to be deployed;
- moving the application to an application staging area;
- activating the application; and
- moving the application from a staging directory for the cluster to a production directory on each cluster server receiving the application before activating the application.

* * * * *

UNITED STATES PATENT AND TRADEMARK OFFICE
CERTIFICATE OF CORRECTION

PATENT NO. : 7,206,817 B2  Page 1 of 1
APPLICATION NO. : 10/341801
DATED : April 17, 2007
INVENTOR(S) : Fanshier et al.

It is certified that error appears in the above-identified patent and that said Letters Patent is hereby corrected as shown below:

On the cover page,

[*] Notice: Subject to any disclaimer, the term of this patent is extended or adjusted under 35 USC 154(b) by 634 days Delete the phrase "by 634 days" and insert -- by 746 days --

Signed and Sealed this

Twenty-second Day of January, 2008

JON W. DUDAS
*Director of the United States Patent and Trademark Office*